US005291411A

United States Patent [19]

Bianco

[11] Patent Number: 5,291,411

[45] Date of Patent: Mar. 1, 1994

[54] APPARATUS AND METHOD FOR REVIEWING PATH OF TRAVEL

[76] Inventor: James S. Bianco, 217 Brainard Rd., Enfield, Conn. 06082

[21] Appl. No.: 790,811

[22] Filed: Nov. 12, 1991

[51] Int. Cl.[5] ........ G01S 3/02

[52] U.S. Cl. ........ 364/449; 364/443; 340/992

[58] Field of Search ........ 364/443, 449; 340/988, 340/989, 991, 992, 993, 902

[56] References Cited

U.S. PATENT DOCUMENTS

| | | | |
|---|---|---|---|
| 4,217,588 | 8/1980 | Freeny, Jr. | 343/112 D |
| 4,296,408 | 10/1981 | Neuringer | 340/539 |
| 4,338,601 | 7/1982 | Nance-Kivell | 340/870.02 |
| 4,350,970 | 9/1982 | von Tomkewitsch | 340/988 |
| 4,484,284 | 11/1984 | Tagami et al. | 364/449 |
| 4,819,174 | 4/1989 | Furuno et al. | 340/988 |
| 4,857,921 | 8/1989 | McBride et al. | 340/902 |
| 5,014,206 | 5/1991 | Scribner et al. | 364/443 |
| 5,044,634 | 9/1991 | Dudley | 340/988 |
| 5,126,941 | 6/1992 | Gurmu et al. | 340/989 |
| 5,170,164 | 12/1992 | Lewis | 340/988 |

*Primary Examiner*—Gary Chin

*Attorney, Agent, or Firm*—John H. Crozier

[57] ABSTRACT

In a preferred embodiment, a plurality of battery-operated radio frequency transmitters that are located throughout a travel route, which transmitters periodically broadcast location numbers, each transmitter having a location number uniquely identifying that transmitter and its location. A radio frequency receiver is located in the object or on the person being monitored. When the receiver detects the carrier frequency of a transmitter, it activates a microprocessor which stores in memory the identification number of that transmitter and the date and time when the number was received. This is repeated within the broadcast range of each transmitter. When the receiver is taken to a home base, the memory is unloaded and the travel route that was taken can be determined together with the times the various check points were passed. The transmitted signal may also include a message that the state of charge of the transmitter battery is low.

17 Claims, 4 Drawing Sheets

APPARATUS AND METHOD FOR REVIEWING PATH OF TRAVEL

BACKGROUND OF THE INVENTION

1. Field of the Invention

The present invention relates to monitoring performance generally and, more particularly, but not by way of limitation, to novel means and method for reviewing the path of travel of an object or a person.

2. Background Art

In many activities, it is desirable to have a system for assuring that personnel are properly discharging their duties. For example, in the case of a police car, it may be of importance to assure that the police car is travelling a prescribed route during the shift of the driver. In the past, such assurance was given by the driver radioing his position to a home base at predetermined intervals or by responding with his position to an inquiry by the home base. While this procedure is relatively satisfactory when properly followed, it relies on someone remembering to make the necessary radio contacts and it is obviously prone to abuse. Some relatively complicated systems have been developed using radio transmitters and receivers which permit monitoring the position of the police car on a substantially current basis.

For another example, in the case of a watchman, it may be of importance to assure that the watchman is making his rounds at the required times. Historically, this was accomplished by the watchman carrying a relatively bulky time recorder in which an entry was made by inserting a key therein at one or more locations throughout the property being guarded. More recently, the conventional time recorders have been replaced with less bulky electronic devices. However, all these devices are not automatic and require that the watchman take some action at each station.

Accordingly, it is a principal object of the present invention to provide means and method for reviewing the route taken by an object or a person which are simple and automatic.

It is a further object of the invention to provide such means and method that are automatic and not easily defeated.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a plurality of battery-operated radio frequency transmitters that are located throughout a travel route, which transmitters periodically broadcast location numbers, each transmitter having a location number uniquely identifying that transmitter and its location. A radio frequency receiver is located in the object or on the person being monitored. When the receiver detects the carrier frequency of a transmitter, it activates a microprocessor which stores in memory the identification number of that transmitter and the date and time when the number was received. This is repeated within the broadcast range of each transmitter. When the receiver is taken to a home base, the memory is unloaded and the travel route that was taken can be determined together with the times the various check points were passed. The transmitted signal may also include a message that the state of charge of the transmitter battery is low.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which:

FIG. 5(*b*) is a schematic block diagram illustrating the components of the receiver module of the present invention.

DETAILED DESCRIPTION OF THE PREFERRED EMBODIMENTS

Figures 1, 2:
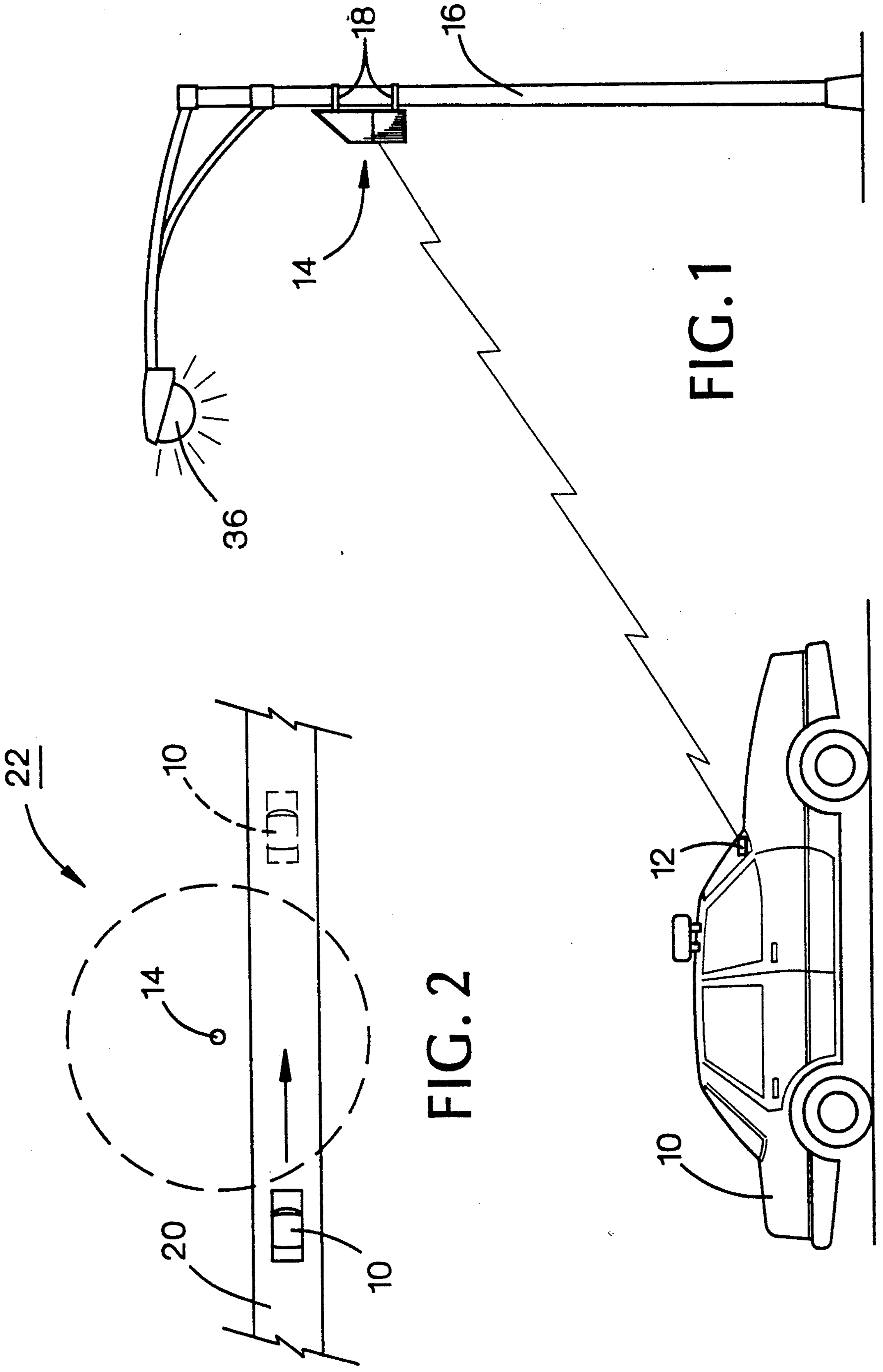
FIG. 1 is a schematic illustration of the present invention as applied to a police car.
FIG. 2 is a top plan view of the illustration of FIG. 1.

Referring now to the Drawing, in which similar or identical elements are given consistent identifying numerals throughout the various figures thereof, FIG. 1 illustrates the present invention as it may be employed in the reviewing of the travel route taken by a police car 10.

Parenthetical references to figure numbers direct the reader to the view(s) in which the element(s) being described is (are) best seen, although the element(s) may be seen also in other views.

Police car 10 has mounted on the dashboard thereof a radio frequency receiver module 12. Receiver module 12 is capable of receiving a radio frequency signal broadcast from a radio frequency transmitter module, generally indicated by the reference numeral 14, fixedly mounted at a predetermined geographical location, such as on a street light pole 16. Transmitter module 14 may be attached to the post by any suitable means such as metal bands 18.

Referring also to FIG. 2, police car 10 is shown (solid lines) moving along road 20 in the direction shown by the arrow and is shown entering the broadcast range of transmitter module 14, generally indicated by the reference numeral 22. Police car 10 is also shown (broken lines) leaving broadcast range 22. Broadcast range 22 has a relatively small radius which may be on the order of about 300–500 feet so as not to overlap other broadcast ranges.

Figure 3:
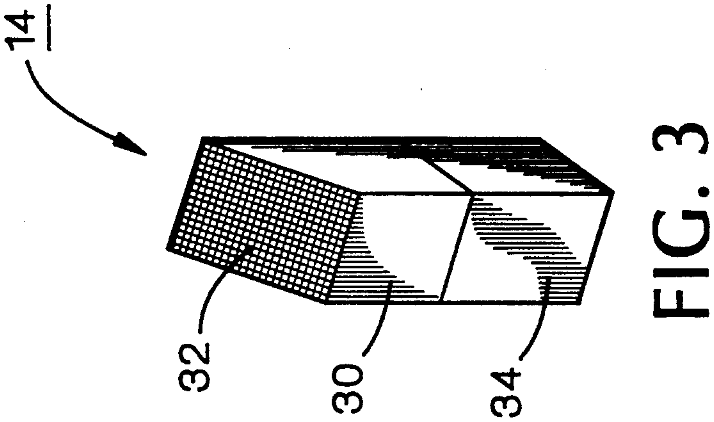
FIG. 3 is a top/front/side perspective view of the transmitter of the present invention.

Referring also to FIG. 3, transmitter module 14 includes a power section 30, on which is mounted a solar panel 32, and a transmitting section 34. It should be noted (FIG. 2) that transmitter module 14 is mounted on street light pole 16 such that light from a lamp thereon falls on solar panel 32. It will be understood, of course, that transmitter module 14 could be mounted, as well on any other suitable structure.

Figure 4:
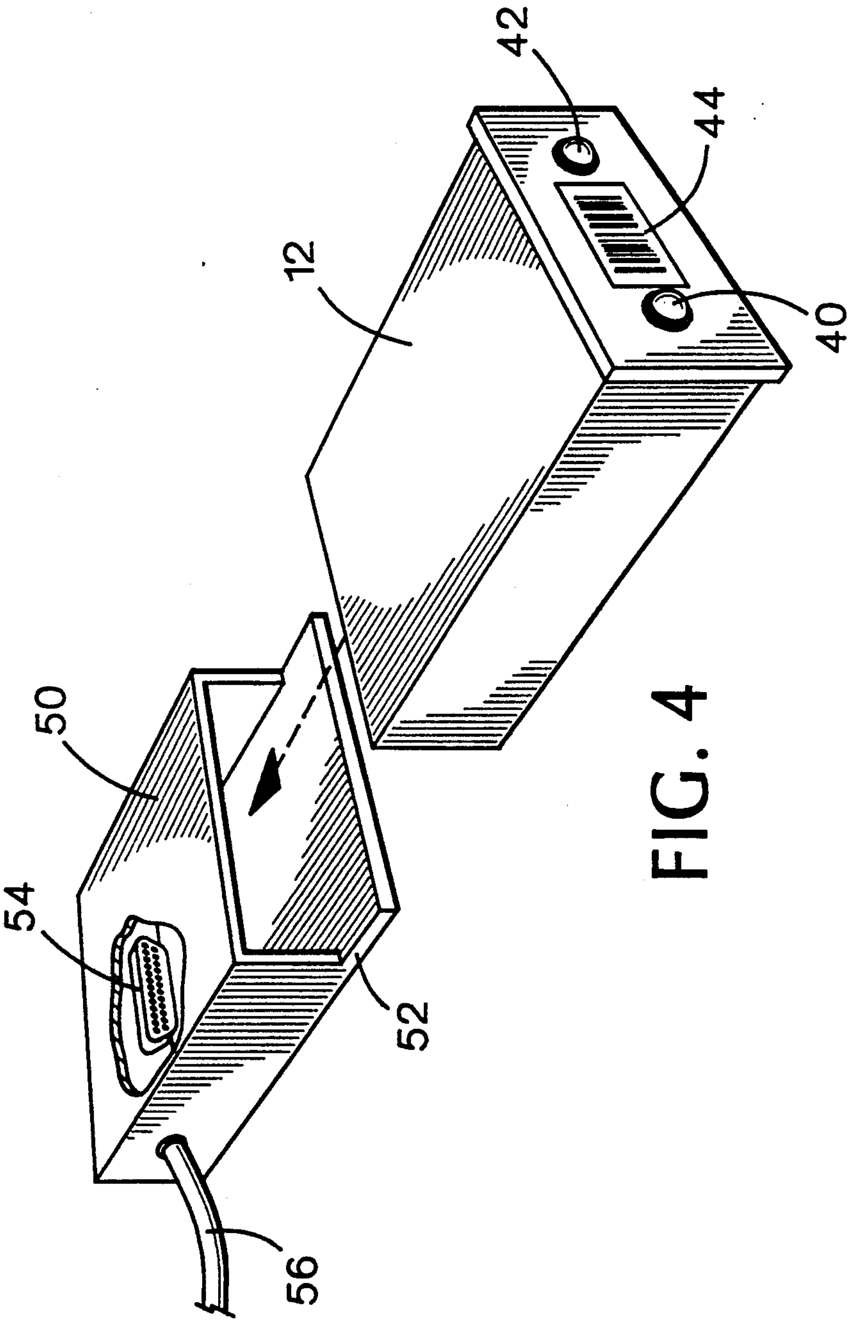
FIG. 4 is a top/front/side perspective view of the receiver of the present invention with a mounting bracket therefor.

Referring now to FIG. 4, receiver module 12 has a "power on" indicator light 40, a "receive" indicator light 42, and an identifying bar code, all on the front side thereof.

Shown with receiver module 12 is a mounting bracket 50 into which receiver module 12 may be inserted, the bracket being permanently affixed to the dashboard of police car 10 or removably affixed thereto by means of double-sided adhesive tape 52. Disposed internally of bracket 50 at the inner end thereof is a multi-pin plug 54 which mates with a corresponding receptacle (not shown) on the rear side of receiver module 12 when the receiver module is inserted in the bracket (broken arrow). Power may be supplied to receiver module 12 through a plug 54 connected by cable 56 to the electrical system (not shown) of police car 10 or a separate battery power source (not shown) may be provided for the receiver module.

Figure 5A:
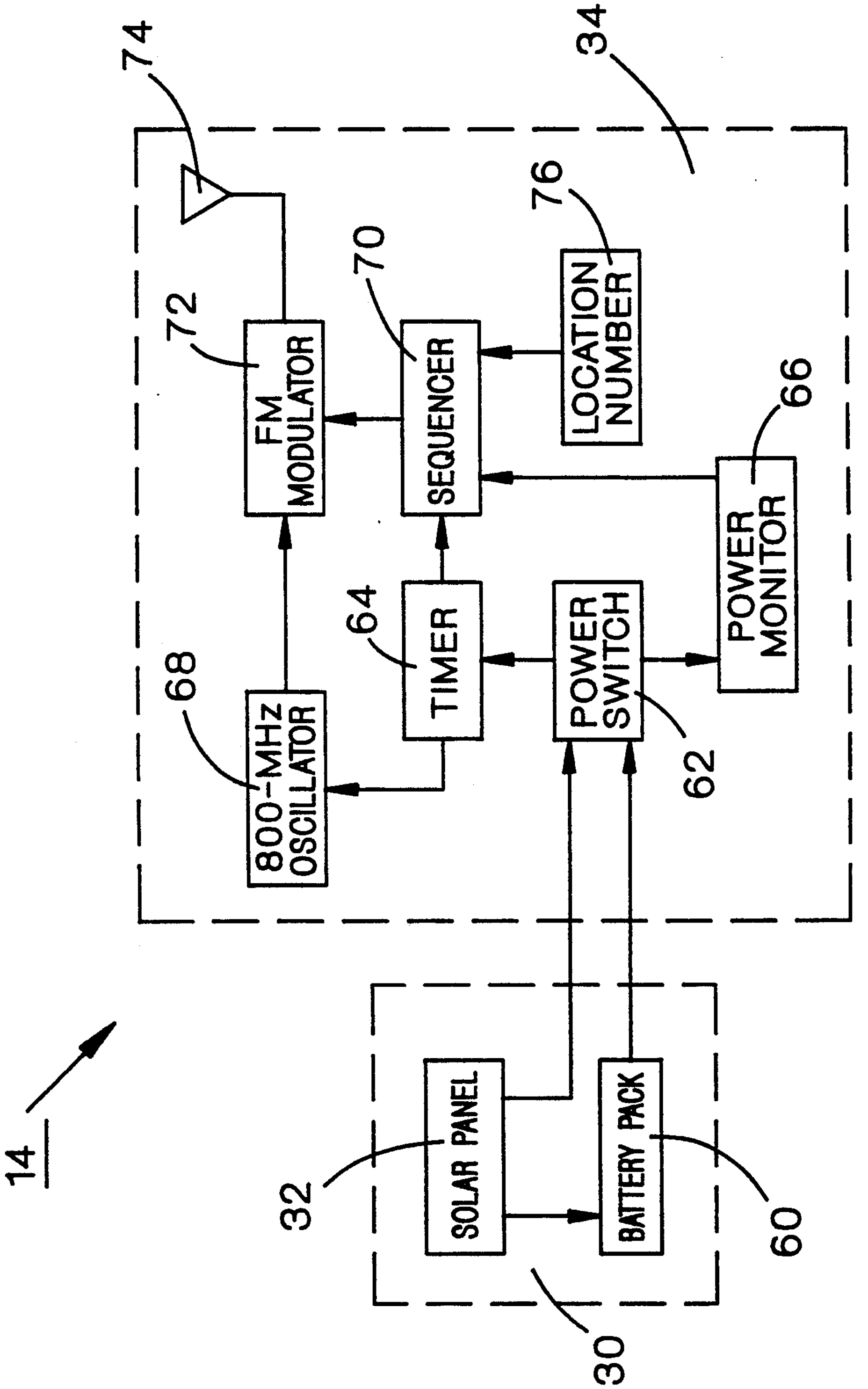
FIG. 5(*a*) is a schematic block diagram illustrating the components of the transmitter module of the present invention.
Figure 5B:
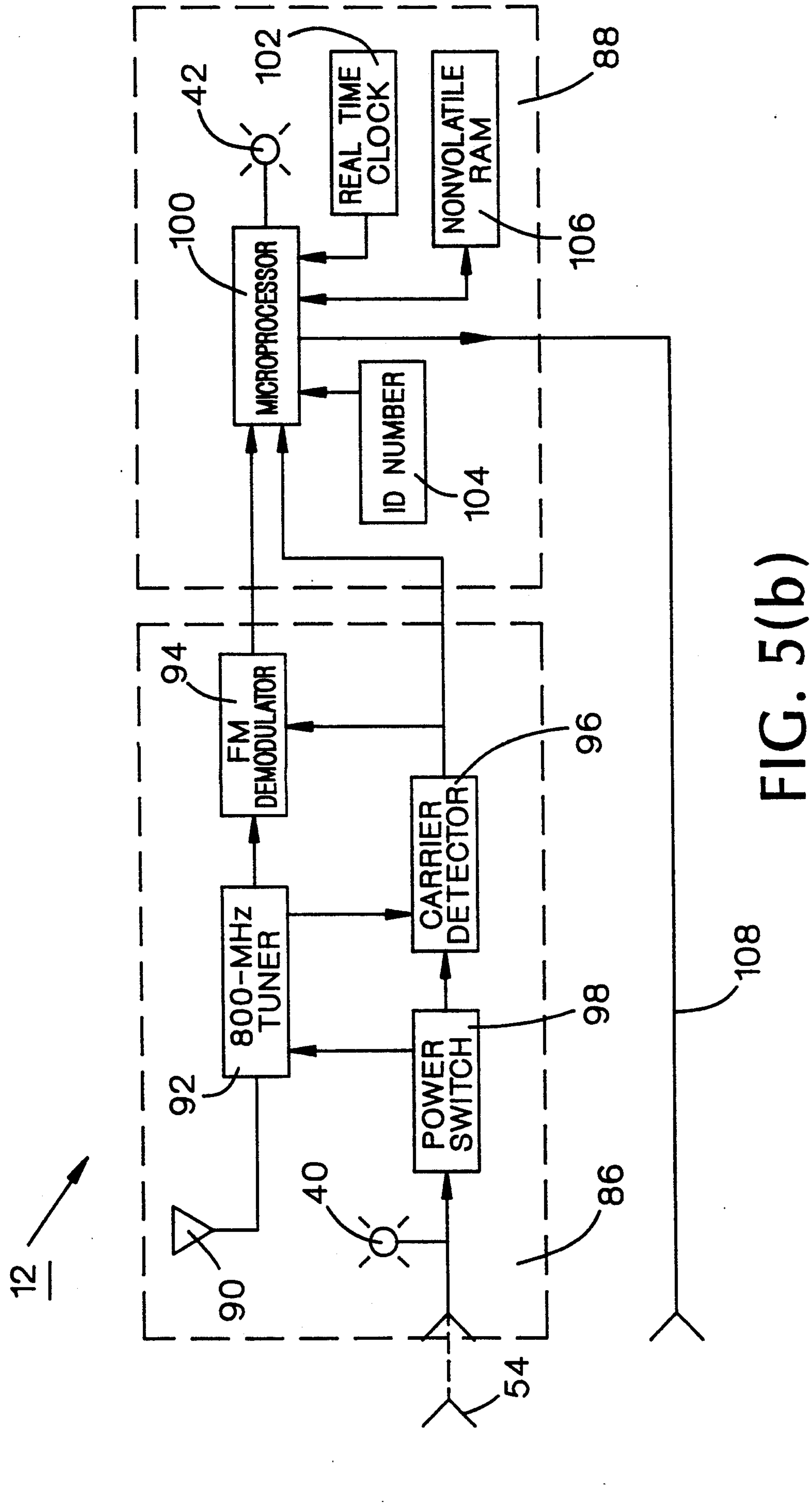

Referring now to FIG. 5(*a*), power section 30 of transmitter module 14 includes solar panel 32 and a battery pack 60, the latter being coupled to the solar panel so that it may be charged therewith. Both solar panel 32 and battery pack 60 are connected to provide power to a power switch 62 in transmitting section 34 of transmitter module 14, the power switch automatically determining from which source to draw power. Power switch 62 furnishes power to a timer 64 and to a power monitor 66. Timer 64 is connected to furnish power to an 800-MHz oscillator 68 and a sequencer 70, both of the latter providing inputs to an FM modulator 72 which is coupled to an antenna 74. Sequencer 70 receives inputs from power monitor 66 and from a memory circuit 76 containing a location number for transmitter module 14.

Referring now to FIG. 5(*b*), receiver module 12 includes a receiving section 86 and a memory section 88. Within receiving section 86 is an antenna 90 connected to an 800-MHz tuner 92 which is coupled to provide inputs to an FM demodulator 94 and to a carrier detector. A power switch 98 is connected to receive power through plug 54 (FIG. 4) and provide power to tuner 92 and carrier detector 96, the latter being connected to provide power to FM demodulator 94. When power is received through plug 54, "power on" indicator 40 (also FIG. 4) is lighted. A microprocessor 100 in memory section 88 of transmitter module 14 receives a demodulated FM signal from FM demodulator 94 and receives power from carrier detector 96, both of the latter being located in receiving section 86 of transmitter module 14. Microprocessor 100 also receives inputs from a real time clock 102 and from a memory circuit 104 containing an identification number for receiver module 12. Microprocessor 100 is connected to provide an output on a lead 108. Coupled to microprocessor 100 is a non-volatile memory 106.

When the system of the present invention is to be used, bar code 44 (FIG. 4) on receiver module 12 is read at the home base of police car 10 and entered into a main computer (not shown) at the home base along with other information such as the time and date and the police officer's badge number. The main computer thus stores information specifically identifying that receiver module 12 was used by that police officer on a particular date. Receiver module 12 is then inserted in bracket 50 FIG. 4) in police car 10.

In operation, timer 64 of transmitting section 34 of transmitter module 14 (FIG. 5(*a*)) causes 800-MHz oscillator and FM modulator to periodically broadcast through antenna 74 the location number from memory circuit 76. The period between such broadcasts may be on the order of 4 or 5 seconds and the duration of each broadcast may be on the order of about 100 milliseconds, the former period being relatively long and the latter period being relatively short in order to conserve power.

When police car 10 enters broadcast range 22 (car shown in solid lines on FIG. 2) of transmitter module 14, carrier detector 96 in receiver module 12 (FIG. 5(*b*)) will very shortly detect that an 800-MHz carrier frequency has been received by tuner 92 through antenna 90 and will activate FM demodulator 94 and microprocessor 100 which will temporarily store the broadcast location number. When the broadcast location number is received a second time, microprocessor 100 will compare it with the first and store it in nonvolatile RAM 106 along with the identification number of the receiver module from memory circuit 104 and the time and date from real time clock 102. This procedure assures that a valid identification number is being received.

While police car 10 remains within broadcast range 22, the same location number will be received by microprocessor 100 which will ignore it as long as the location number is the same as was last stored in nonvolatile RAM 106. When police car 10 leaves broadcast range 22, carrier detector 96 will detect the absence of the periodic transmissions and will remove power from microprocessor 100, which event will cause the microprocessor to store in nonvolatile RAM 106 the time and date the police car left that broadcast range. It will be understood that, as police car 10 proceeds on its rounds, it will traverse a number of other broadcast ranges of other transmitter modules and data indicative of the time it remains in each will be stored in nonvolatile RAM 106. Whenever microprocessor 100 is activated, such is indicated by lighted "receive" indicator 42 (FIGS. 4 and 5(*b*)).

When police car 10 returns to its home base, receiver module 12 is removed from the car and inserted into a reading receptacle (not shown) to input to the home base computer the information stored in nonvolatile RAM 106. The information is then used to determine the route taken by the police car and the times it was in or between various broadcast ranges.

Referring again to FIG. 5(*a*), there is included in transmitter module 14 means to automatically indicate when solar panel 32 and/or battery pack 60 are becoming weak or defective. Here, power monitor 66 continuously monitors the condition of the power being supplied to power switch 62 and provides to sequencer 70 a signal indicative thereof. When sequencer 70 is activated by timer 64 during a broadcast interval, it alternatingly provides to FM modulator 72 the battery condition signal from sequencer 70 and the location number from memory circuit 76. When the demodulated signal is received by microprocessor 100 is receiver module 12, it will contain, serially, the location number of transmitter module 14 and an indication of the condition of the power source in the transmitter module. If the power condition signal indicates that the power source is becoming weak or defective, microprocessor 100 will store that information in nonvolatile RAM 106. That information will be read out at the home base and a note automatically made that power section 30 of transmitter module 14 needs to be replaced or serviced.

While the present invention has been described with reference to reviewing the route taken by a police car, it is applicable to other situations as well. For example, a warehouse guard might be required to carry a receiver module which would be responsive to transmitters modules located throughout the warehouse. Later readout of the receiver module would determine whether the guard had made the required inspection rounds.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A system for reviewing the travel of an object or a person, comprising:
   (a) single, radio frequency transmitting means disposed at a fixed, predetermined geographical location to broadcast a signal containing first information identifying said location; and
   (b) radio frequency receiving means to be carried by said object or person, having memory means and real time clock means, to receive said broadcast signal, means for detecting a broadcast range of said transmitting means based on a carrier frequency of said broadcast signal, when said object or person is within the broadcast range of said transmitting means, and to store said first information in said memory means together with the current times and dates from said real time clock means, when said object or person enters and leaves said broadcast range, for later readout of said first information with said times and dates to determine the interval of time said object or person was in said broadcast range.

2. A system, as defined in claim 1, wherein said receiving means further includes:
   (a) a carrier detector to detect the carrier frequency of said broadcast signal;
   (b) a microprocessor to receive said first information and to store said first information in said memory means; and
   (c) said carrier detector to activate said microprocessor when said carrier frequency is detected; and
   (d) said carrier to de-activate said microprocessor when said carrier frequency is no longer detected, said de-activation to cause said microprocessor to store in said memory means, for later readout, said times and dates said object or person leaves said broadcast range.

3. A system, as defined in claim 1, wherein said transmitting means is battery powered and includes a solar panel to charge said battery.

4. A system, as defined in claim 3, wherein:
   (a) said broadcast signal includes second information as to the condition of said battery; and
   (b) said microprocessor stores in said memory means, for later readout, said second information when said second information indicates that said battery is becoming weak or defective.

5. A system, as defined in claim 4, wherein said transmitting means includes sequencing means to cause said first information and said second information to be alternatingly broadcast.

6. A system, as defined in claim 1, wherein said first information is periodically broadcast.

7. A system, as defined in claim 6, wherein said first information is broadcast approximately every four to five seconds.

8. A system, as defined in claim 6, wherein the duration of each broadcast of said first information is approximately 100 milliseconds.

9. A system, as defined in claim 2, wherein: said microprocessor:
   (a) receives said first information the first time it is received by said carrier detector and to temporarily store said first information; and
   (a) receives said first information the second time it is received by said carrier detector and to permanently store said first information in said memory means if said first information received at said first and second times are identical.

10. A method for reviewing the travel of an object or a person, comprising:
   (a) broadcasting at a single, predetermined, fixed, geographical location a radio frequency signal containing first information identifying said location;
   (b) detecting a broadcast range of said radio frequency signal based on a carrier frequency of said radio frequency signal, and
   (c) receiving at said object or person said radio frequency signal and storing said first information in memory means together with the current times and dates, when said object or person enters and leaves the broadcast range, for later readout of said first information with said times and dates to determine the interval of time said object or person was in said broadcast range.

11. A method, as defined in claim 10, further comprising the steps of:
   (a) detecting the carrier frequency of said broadcast signal;
   (b) activating a microprocessor when said carrier frequency is detected and storing therein said first information; and
   (c) de-activating said microprocessor when said carrier frequency is no longer detected, said de-activation causing said microprocessor to store in said memory means, for later readout, said times and dates said object or person leaves said broadcast range.

12. A method, as defined in claim 11, further comprising the steps of:
   (a) broadcast with said radio frequency signal second information as to the condition of the power source for said broadcast; and
   (b) storing in said memory means, for later readout, said second information when said second information indicates that said power source is becoming weak or defective.

13. A method, as defined in claim 12, further including alternatingly broadcasting said first information and said second information.

14. A method, as defined in claim 10, further comprising periodically broadcasting said first information.

15. A method, as defined in claim 14, further comprising broadcasting said first information approximately every four to five seconds.

16. A method, as defined in claim 14, further comprising broadcasting said first information for a length of time of approximately 100 milliseconds.

17. A method, as defined in claim 11, wherein: said microprocessor:

(a) receives said first information the first time it is received by a carrier detector and temporarily stores said first information; and (b) receives said first information the second time it is received by said carrier detector and permanently stores said first information in said memory means if said first information received at said first and second times are identical.

* * * * *